United States Patent
Jahan

(10) Patent No.: US 12,294,478 B2
(45) Date of Patent: May 6, 2025

(54) TELECOMMUNICATIONS METHOD WITH PHASE-OFFSET POLAR CONSTELLATION FOR REDUCING PAPR, AND CORRESPONDING DEVICES

(71) Applicant: Orange, Issy-les-Moulineaux (FR)

(72) Inventor: Bruno Jahan, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 85 days.

(21) Appl. No.: 18/042,523

(22) PCT Filed: Sep. 1, 2021

(86) PCT No.: PCT/FR2021/051505
§ 371 (c)(1),
(2) Date: Feb. 22, 2023

(87) PCT Pub. No.: WO2022/049343
PCT Pub. Date: Mar. 10, 2022

(65) Prior Publication Data
US 2023/0327935 A1  Oct. 12, 2023

(30) Foreign Application Priority Data
Sep. 1, 2020 (FR) ........................... 2008865

(51) Int. Cl.
*H04L 27/26* (2006.01)
(52) U.S. Cl.
CPC .................. *H04L 27/2621* (2013.01)
(58) Field of Classification Search
CPC .................. H04J 11/00; H04W 80/00
USPC ....... 375/219, 260, 261, 264, 295–297, 332, 375/340
See application file for complete search history.

(56) References Cited

U.S. PATENT DOCUMENTS

2017/0163459 A1* 6/2017 Tanahashi ........... H04L 27/2666
2021/0091858 A1* 3/2021 Bonetti .............. H04B 10/5161

OTHER PUBLICATIONS

International Search Report dated Nov. 29, 2021 for corresponding International Application No. PCT/FR2021/051505, filed Sep. 1, 2021.
Written Opinion of the International Searching Authority dated Nov. 29, 2021 for corresponding International Application No. PCT/FR2021/051505, filed Sep. 1, 2021.
Krishna Patteti et al., "Optimal Performance of OFDM Signal using PAPR Reduction Techniques in LTE Systems", Jan. 1, 2014 (Jan. 1, 2014), p. 1022-1027, Retrieved from the Internet: URL:https://www.researchgate.net/publication/275207543_Optimal_Performance_of_OFDM_Signal_using_PAPR_Reduction_Techniques_in_LTE_Systems, XP055816133.
Ugolini Alessandro et al., "Spiral Constellations for Phase Noise Channels", Nov. 1, 2019 (Nov. 1, 2019), vol. 67, No. 11, p. 7799-7810, XP011757246.
Zhou Dekun et al., "Polar-coded modulation based on the amplitude phase shift keying constellations", Sep. 1, 2017 (Sep. 1, 2017), vol. 14, No. 9, p. 166-177, XP011671178.

* cited by examiner

*Primary Examiner* — Shawkat M Ali
(74) *Attorney, Agent, or Firm* — David D. Brush; Westman, Champlin & Koehler, P.A.

(57) ABSTRACT

A telecommunications method includes transmitting a multicarrier symbol constructed from points of a polar constellation that are modulated in blocks and controlling at least one phase rotation vector of one of the modulated blocks of points in order to reduce the peak-to-average power ratio of the transmitted multicarrier symbol.

14 Claims, 6 Drawing Sheets

TELECOMMUNICATIONS METHOD WITH PHASE-OFFSET POLAR CONSTELLATION FOR REDUCING PAPR, AND CORRESPONDING DEVICES

CROSS-REFERENCE TO RELATED APPLICATIONS

This Application is a Section 371 National Stage Application of International Application No. PCT/FR2021/051505, filed Sep. 1, 2021, which is incorporated herein by reference in its entirety and published as WO 2022/049343 A1 on Mar. 10, 2022, not in English.

FIELD OF THE INVENTION

The present invention relates to the field of telecommunications. Within this field, the invention more particularly relates to digital communications involving transmission of a radio signal (6G, 5G, Wi-Fi, etc.) the PAPR of which is limited.

It is in particular applicable to access points and to portable telecommunications devices compatible with standards (6G, etc.) in which the frequency band of transmission extends beyond one gigahertz.

PRIOR ART

Figure 1:
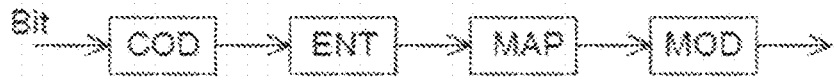

Digital communications employ digital transmission chains that use well-known signal-processing modules such as illustrated in FIG. 1.

Figure 2:
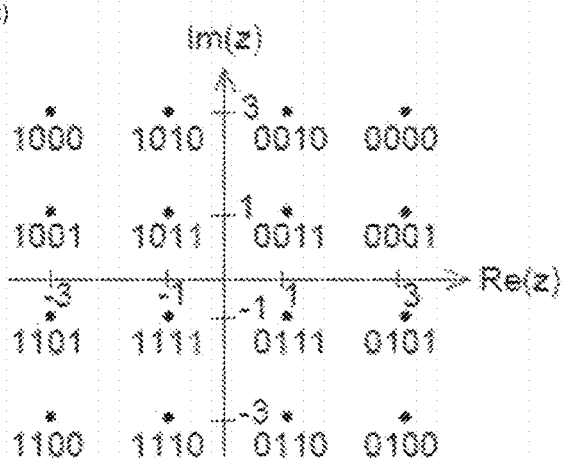

A conventional chain has been schematically shown in FIG. 1. This chain receives input data Bit from a binary source, the binary data being representative, for example, of an audio signal (voice), of a multimedia signal (television stream, Internet stream), etc. The input data are encoded via an error-correcting encoder COD (e.g. turbo code, LDPC, polar code). An interleaver ENT interleaves the encoded data. A signal binary encoder MAP converts a binary data packet, such as a code word, into one point of a constellation (BPSK, QPSK, mQAM, etc.). This encoder is also called a mapper, and it is equivalently said that the mapper maps the input data to the points of the constellation. The output of this mapper consists of the symbols of the constellation to which the input data were mapped, or equivalently mapped data is referred to when designating the data output. It will be noted that the m in the expression mQAM (QAM being the acronym of Quadrature Amplitude Modulation) designates the modulation order. FIG. 2 shows conventional 16 QAM modulation. The signal binary encoder allows the binary data delivered by the channel encoder (error-correcting encoder) to be projected, or in other words mapped, onto a two-axis plane, according to a given constellation. Each point of the constellation thus transports one packet formed from one or more bits. For example, when mapping to BPSK, QPSK or mQAM constellations, the number of bits that may be mapped to a point of the given constellation is as follows:

1 bit for BPSK,
2 bits for QPSK or 4-QAM,
3 bits for 8-QAM,
4 bits for 16-QAM, etc.

The mapped data are modulated by a multi-carrier modulator MOD to generate multi-carrier symbols. The output of the modulator is fed to a power amplifier of the transmitter, with a view to transmitting a radio signal.

Among multi-carrier modulation schemes, OFDM modulation (OFDM being the acronym of Orthogonal Frequency-division Multiplexing) has become the benchmark modulation scheme since its adoption in various standards such as DAB, DVBT, ADSL, 4G and 5G.

The intrinsic advantages of this OFDM modulation have ensured its success in the aforementioned standards. Among these advantages, mention may be made of a spectrum that is less spread than when single-carrier modulation is employed, of robustness against channel time dispersion and, reception-end, of straightforward equalization with one coefficient per carrier (i.e. ZF equalization, ZF being the acronym of Zero Forcing).

Figure 3:
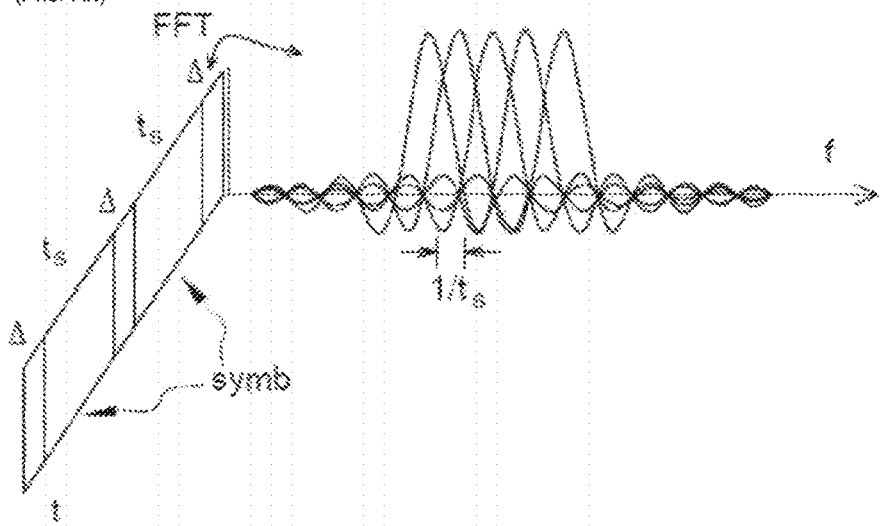

FIG. 3 illustrates the output of a modulator implementing OFDM modulation. Such an OFDM modulator is often achieved by means of an inverse Fourier transform (IFFT). The various carriers of an OFDM symbol are modulated with the points of the constellation to which the data packets were mapped. The frequency interval between carriers is $1/t_s$ with $t_s$ the duration of an OFDM symbol. A guard interval of duration A is inserted between two successive OFDM symbols symb. This guard interval makes it possible to handle echoes caused by the multiple reflections that occur during radio transmissions over the channel, which is generally air. This interval may be used to perform a first so-called coarse time synchronization of the system (between a transmitter and a receiver). It may thus allow, reception-end, the FFT window to be positioned before the received radio signal is demodulated. Applying an FFT reception-end allows the IFFT applied transmission-end to be inverted, i.e. allows the received OFDM symbols to be demodulated.

As a result of its construction, OFDM modulation (like all multi-carrier modulations) generates peaks that may be large and detrimental to correct operation of the power amplifiers of the transmitter. These peaks define the peak-to-average power ratio (PAPR) of the signal. PAPR is the maximum value of the time-domain multi-carrier signal x(t) squared over the average power of the signal:

$$PAPR_{(dB)} = 10 * \log_{10}\left(\frac{\max(x_{(t)}^2)}{\overline{x_{(t)}^2}}\right)$$

Figure 4:
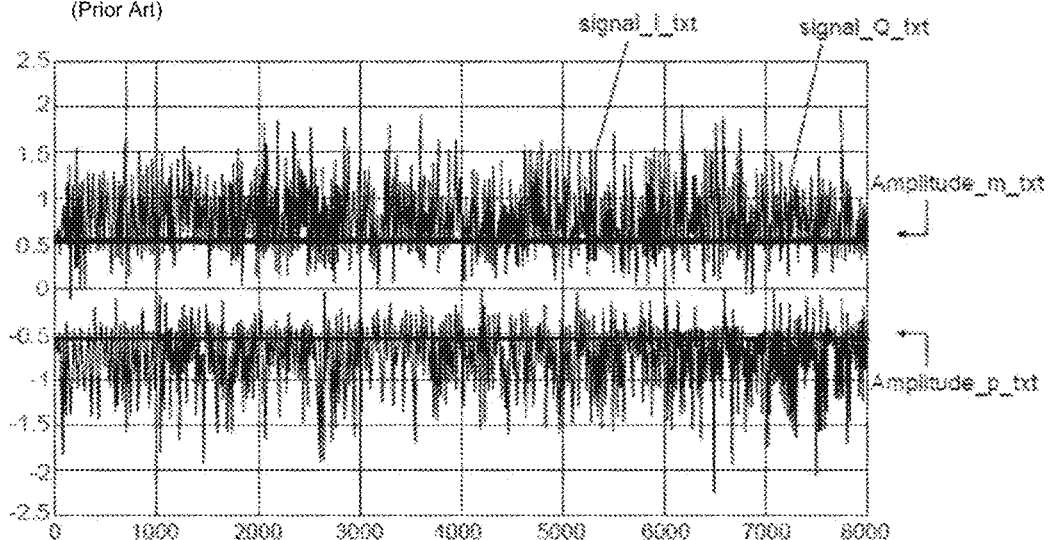

FIG. 4 illustrates the PAPR of a time-domain signal resulting from an OFDM modulation composed of 2048 carriers modulated with the points of a 16-QAM modulation. The average PAPR of this signal is about 9.2 dB.

To decrease PAPR, it is known to use a technique called partial transmit sequence (PTS), which modifies the overall phase of an OFDM sub-block. However, this technique requires phase information to be transmitted to the receiver to correct this modification of the phase of the OFDM sub-block, this decreasing the spectral efficiency of the radio system or the net throughput of the signal.

Moreover, the higher transmission frequencies get, the greater imperfections in oscillators become, introducing phase variations in addition to those due to the Doppler effect associated with movement of the receiver.

There is therefore a need for a telecommunication method that will allow the situation to be improved, in particular for future standards (6G, etc.) in which the frequency band of transmission extends beyond one gigahertz and in which there are constraints regarding robustness against phase variations.

Main Features of the Invention

One subject of the invention is a telecommunication method involving transmission of a multi-carrier symbol constructed from the points of a polar constellation, said points being block modulated with control of at least one phase-rotation vector of one of these blocks of modulated points to decrease a PAPR of the transmitted multi-carrier symbol.

A polar constellation according to the invention comprises a set of M points the coordinates of which expressed in polar form $a_m \times e^{j\varphi_m}$, m=0, ..., M−1, which are said to be polar coordinates, with reference to a representation with two axes, are determined such that $a_{m+1}=a_m+p$, p>0, a real number, being the amplitude interval of the constellation.

Application of a phase rotation or phase shift to one or more of the points mapped to the carriers, by means of the rotation vector, to decrease the PAPR of the multi-carrier symbol, is achieved, according to the method, without transmission of any information on this phase shift to the receiver. Furthermore, despite this absence of transmitted information, the receiver is advantageously able to determine, without ambiguity, the received points of the constellation. Specifically, the polar constellation allows up to a certain amount of phase shift to be accommodated, which amount is determined by the number of points of the constellation on a given circle.

A telecommunication method according to the invention allows various constraints with respect to phase variations to be addressed through definition of the phase values used for the various points. This method is therefore very flexible and adaptable depending on the phase constraints.

The constellation used also allows the robustness of the system against phase variations caused by oscillator imperfections to be increased, in particular at high frequencies beyond 6 GHz.

Furthermore, a telecommunication method according to the invention allows various constraints with respect to variations in amplitude (noise) to be addressed through modification of the value of the interval, which may be parametrizable. This method is therefore very flexible and adaptable depending on the noise constraints.

According to one subject of the invention, a telecommunication method comprises:
- mapping, via a mapper, input data to points of a constellation comprising a set of M points the coordinates of which expressed in polar form $a_m \times e^{j\varphi_m}$, m=0, ..., M−1 are determined such that $a_{m+1}=a_m+p$, p>0, a real number, being the amplitude interval of the constellation, which is said to be polar,
- block modulation, via K modulators, of the points of the constellation, these points being input into the K modulators, to generate K symbols, K≥2,
- $1^{st}$ addition, via an adder, of the K symbols, to obtain a multi-carrier symbol, and determination of a PAPR of the multi-carrier symbol, which is said to be the initial PAPR,
- phase rotation, via a phase shifter, of at least one of the K symbols by a rotation angle θ, to generate K symbols, which are said to be phase-shifted,
- $2^{nd}$ addition, via an adder, of the K phase-shifted symbols, to obtain a new multi-carrier symbol,
- comparison of the initial PAPR and of a PAPR of the new multi-carrier symbol, the lowest PAPR becoming the initial PAPR,
- transmission of the multi-carrier symbol of lowest PAPR.

According to one embodiment, the modulation is implemented via an inverse Fourier transform.

An inverse Fourier transform allows a frequency domain to be efficiently and simply converted to a time domain, and an OFDM symbol to be obtained.

According to one embodiment, the phase rotation, the 2nd addition, and the comparison are performed iteratively for a plurality of different phase-rotation vectors.

During the iterative processing, use of a plurality of different phase-rotation values allows the rotation vector that gives the lowest PAPR to be targeted.

According to one embodiment, the iterations on the various phase-rotation vectors are iterated for a plurality of symbols. A constellation comprises a set of M points the coordinates of which expressed in polar form $a_m \times e^{j\varphi_m}$, m=1, ..., M−1 are determined such that $a_{m+1}=a_m+p$, p>0, a real number, being the amplitude interval of the constellation, which is said to be polar, the method being such that the two axes define quadrants and that the polar coordinates are determined per quadrant:

$$a_{m+1} = a_m + p, m = 0, \ldots, \frac{M}{4} - 1.$$

This embodiment makes it possible to use high modulation orders to meet the increasing demand for throughput even in the absence of pilots, while making it possible to absorb a phase variation that may range up to π/2 by limiting to four the number of points on a given circle. According to one embodiment, M=16, p=1 and such that for each quadrant $\varphi_m = \alpha \times \pi/12$ with α a natural number.

This embodiment is particularly advantageous because the obtained symbols may be demodulated by a conventional demodulator: they are compatible with demodulators designed for conventional 16-QAM modulation, in which the four points of a quadrant are distributed in a square.

According to one embodiment, for each quadrant $$\varphi_{m+1} = \varphi_m, m = 0, \ldots, \frac{M}{4} - 1.$$

The polar constellation according to this embodiment is defined per quadrant and replicated between the various quadrants with the particularity that the phase of the points is the same within a quadrant. This embodiment makes it possible to use medium modulation orders to meet the increasing demand for throughput even in the absence of pilots, while making it possible to absorb a phase variation that may range up to π/2 by limiting the number points on a given circle to four. According to one embodiment, a constellation comprises a set of M points the coordinates of which expressed in polar form $a_m \times e^{j\varphi_m}$, ..., m=0, M−1 are determined such that $a_{m+1}=a_m+p$, p>0, a real number, being the amplitude interval of the constellation, which is said to be polar, the method being such that the two axes define quadrants and that the polar coordinates are determined per set of two quadrants:

$$a_{m+1} = a_m + p, m = 0, \ldots, \frac{M}{2} - 1.$$

This embodiment makes it possible to use high modulation orders to meet the increasing demand for throughput even in the absence of pilots, while making it possible to absorb a phase variation that may range up to π by limiting the number points on a given circle to two.

According to one embodiment, for two quadrants taken together $$\varphi_{m+1} = \varphi_m, m = 0, \ldots, \frac{M}{2} - 1.$$

The polar constellation according to this embodiment is defined per block of two quadrants and replicated between these two blocks with the particularity that the phase of the points is the same within a block.

According to one embodiment, a constellation comprising a set of M points the coordinates of which expressed in polar form $a_m \times e^{j\varphi_m}$, m=0, ..., M−1 are determined such that am+i =$a_m$+p, p>0, a real number, being the amplitude interval of the constellation, which is said to be polar, the method being such that the polar coordinates are further determined such that $\varphi_{m+1}=\varphi_m+p'=\varphi_m+p'''\times\pi$ with p'''' a non-zero real number.

This mode uses constellations, which are said to be spiral constellations, defined on all the quadrants i.e. over 2π, i.e. the four quadrants are considered to be one. This embodiment of the method makes it possible to introduce a phase variation that may range up to 2π on any point of the constellation. Although no phase-rotation information is transmitted to the receiver in the method, the receiver is nonetheless able to determine, without ambiguity, the received constellation points since the constellation allows any phase rotation (up to 2π) to be absorbed.

Such an embodiment is particularly suitable for systems confronted with a lot of phase noise, which is the case with communications taking place in the terahertz band. Specifically, at these frequencies oscillators exhibit a lot of phase noise. Spiral constellations make it possible to obtain both good immunity to noise and a good immunity to phase variations, and are therefore particularly advantageous for communications in the terahertz domain.

This embodiment is as robust against phase variations as an embodiment in which all the points of the constellation have the same phase, but in addition it advantageously increases the minimum Euclidean distance of the points of the constellation.

According to one embodiment, a constellation comprising a set of M points the coordinates of which expressed in polar form $a_m \times e^{j\varphi_m}$, m=0, ..., M−1 are determined such that $a_{m+1}=a_m+p$, p>0, a real number, being the amplitude interval of the constellation, which is said to be polar, the method being such that $\varphi_m=\varphi$ for m=0, ..., M−1.

The polar constellation according to this embodiment comprises points all having the same phase with a constant amplitude interval between two neighboring points. This type of polar constellation has a high immunity to phase variations i.e. of up to 2π, but a relatively low immunity to noise.

Another subject of the invention is a reception method, comprising:
reception of a radio signal representing multi-carrier symbols,
demodulation by a demodulator (DEMOD) of multi-carrier symbols, to estimate points of a constellation,
demapping, via a demapper (DEMAP), of the points of the constellation, to estimate data mapped to these constellation points, the constellation comprising a set of M points the coordinates of which expressed in polar form $a_m \times e^{j\varphi}$, m=0, ..., M−1, which are said to be polar coordinates, with reference to a representation with two axes, are determined such that $a_{m+1}=a_m+p$, with p>0, a positive real number, being the amplitude interval of the constellation.

The invention further relates to a telecommunication equipment, which comprises:
a mapper for mapping input data to points of a constellation, the constellation comprising a set of M points the coordinates of which expressed in polar form $a_m \times e^{j\varphi_m}$, m=0, ..., M−1, which are said to be polar coordinates, with reference to a representation with two axes defining four quadrants, are determined such that $a_{m+1}=a_m+p$, p>0, a real number, being the amplitude interval of the constellation,
K modulators for block modulating the points of the constellation and for generating K symbols, K≥2,
a $1^{st}$ complex adder for adding the K symbols to obtain a multi-carrier symbol,
a computer for computing a PAPR of the multi-carrier symbol, which is said to be the initial PAPR,
a phase shifter for shifting the phase of at least one of the K symbols by a phase-rotation vector, to generate K symbols, which are said to be phase-shifted,
a $2^{nd}$ complex adder for adding the K phase-shifted symbols to obtain a new multi-carrier symbol,
a computer for comparing the initial PAPR and a PAPR of the new multi-carrier symbol, the lowest PAPR becoming the initial PAPR,
a transmitter for transmitting the multi-carrier symbol of lowest PAPR.

The invention further relates to a telecommunication equipment, which comprises:
a receiver for receiving a radio signal representing multi-carrier symbols,
a demodulator for demodulating the multi-carrier symbols and estimating points of a constellation, the constellation comprising a set of M points the coordinates of which expressed in polar form $a_m \times e^{j\varphi_m}$, m=1, ..., M−1, which are said to be polar coordinates, with reference to a representation with two axes defining four quadrants, are determined such that $a_{m+1}=a_m+p$, p>0, a real number, being the amplitude interval of the constellation,
a demapper for demapping the points of the constellation and estimating data mapped to these constellation points.

The proposed invention thus allows a plurality of objectives to be achieved:
PAPR to be limited via block modulation of the points of the polar constellation, followed by application of a phase rotation to one or more of these modulated blocks,
the robustness of the system against phase variations caused by oscillator imperfections to be increased, at high frequencies beyond 6 GHz,
the intrinsic quality of so-called low-cost systems to be improved,
the robustness of modulators and demodulators against Doppler shift, which is mainly caused by movement of the receiver/terminal, to be improved.

All of the obtained improvements allow multi-carrier systems to be used at high frequencies, and in particular in millimeter (terahertz) bands and beyond.

LIST OF THE FIGURES

Figure 5:
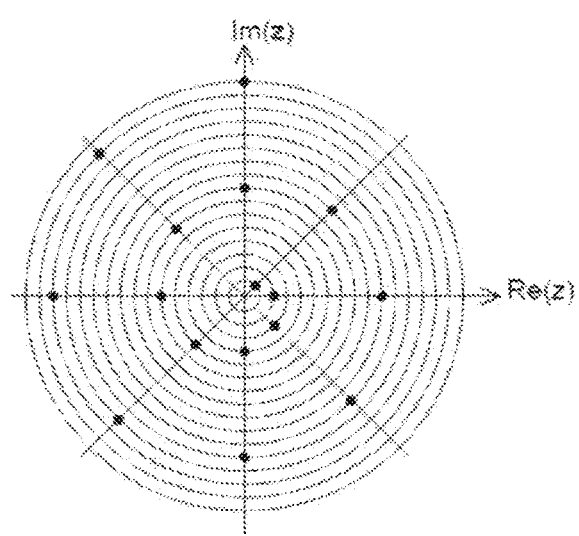
Figure 6:
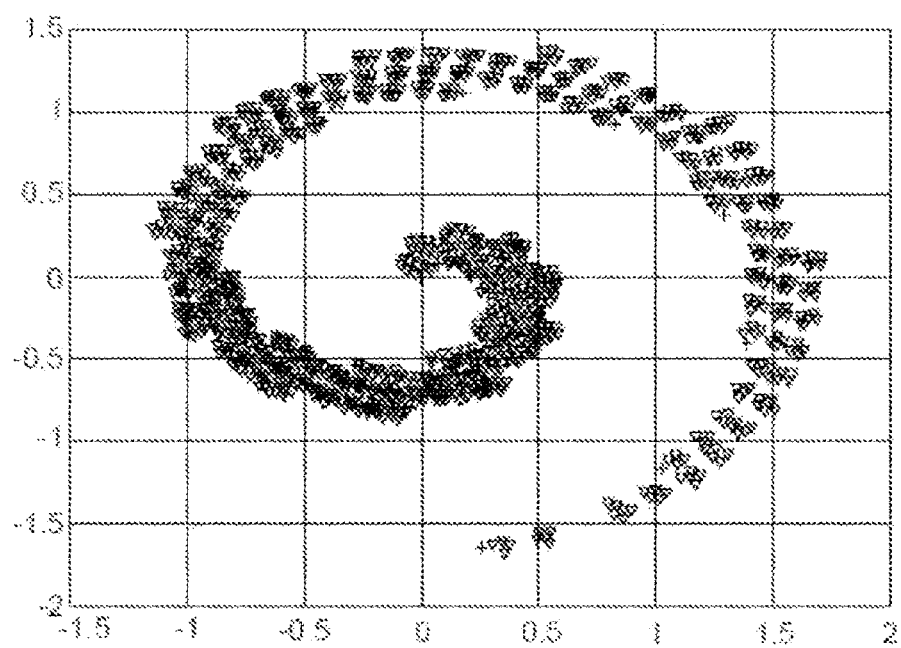
Figure 7:
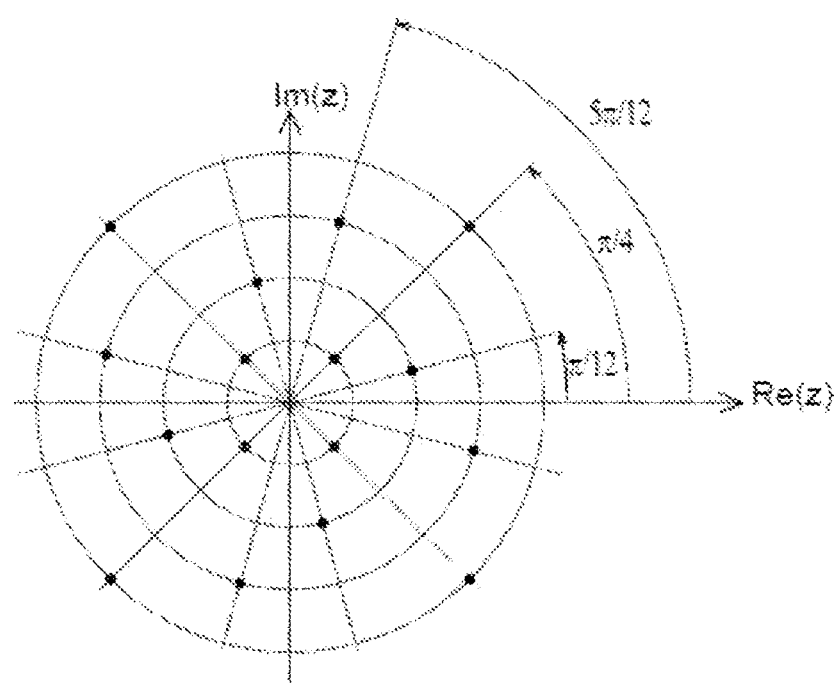
Figure 8:
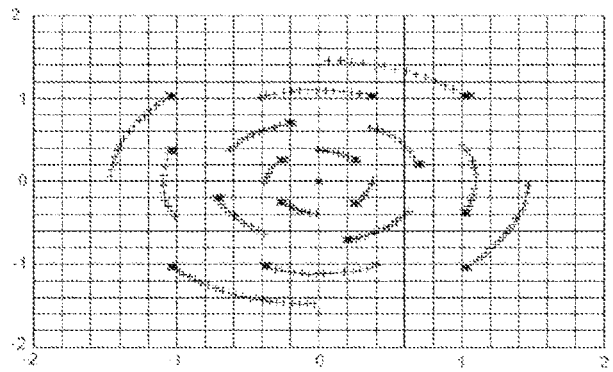
Figure 9:
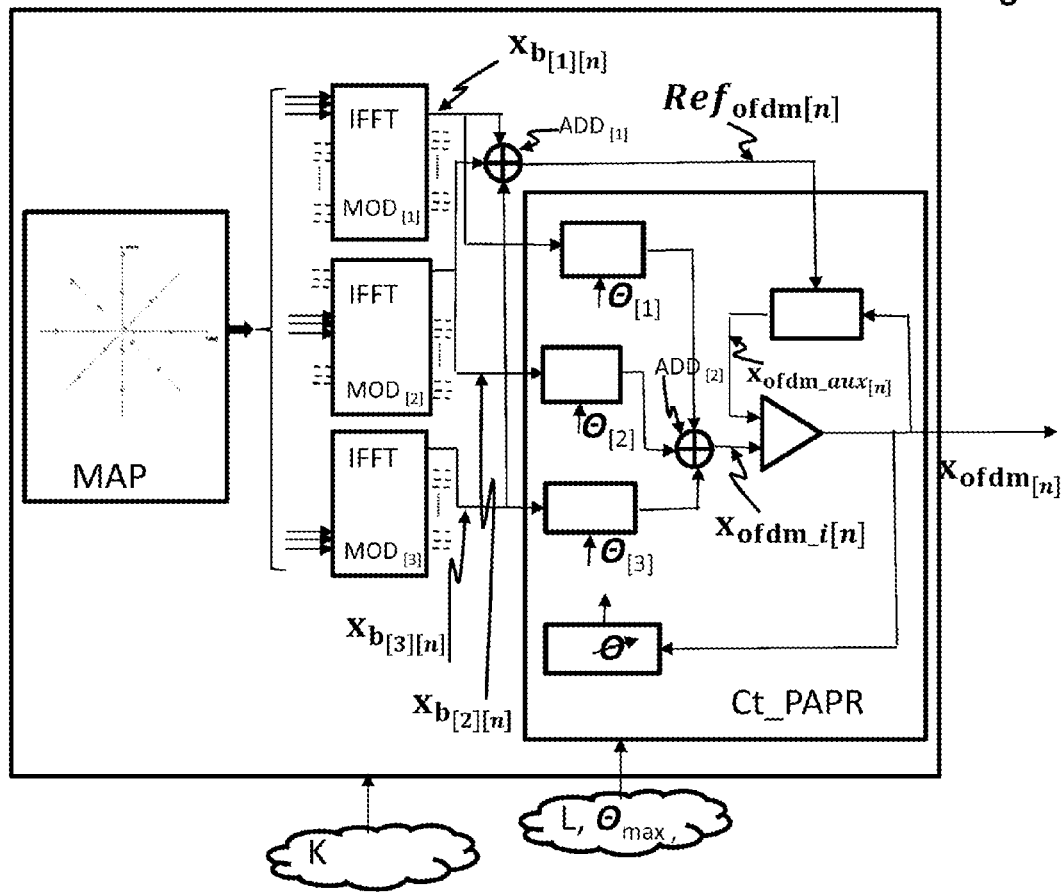
Figure 10:
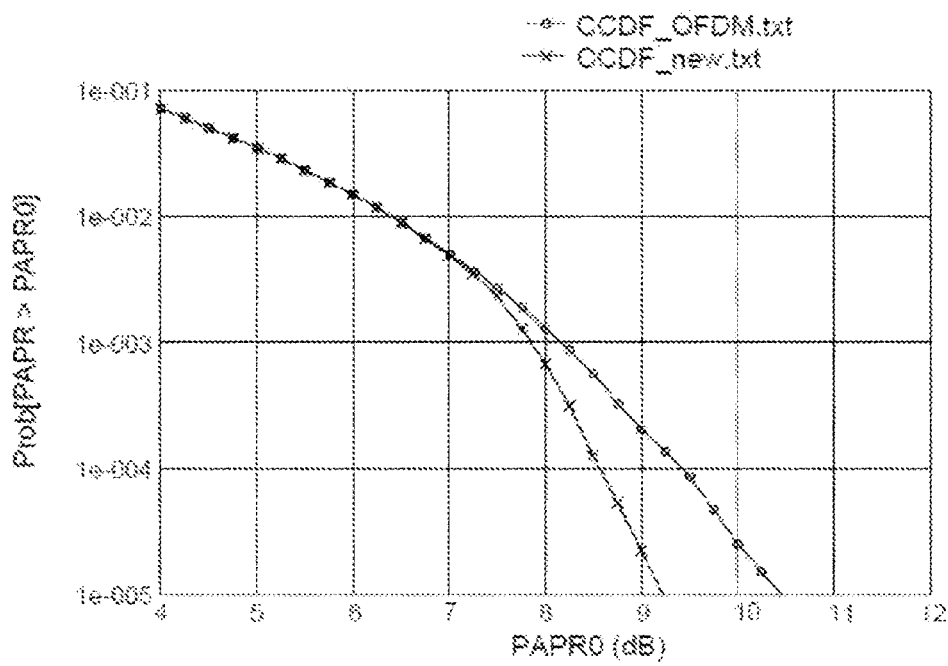
Figure 11:
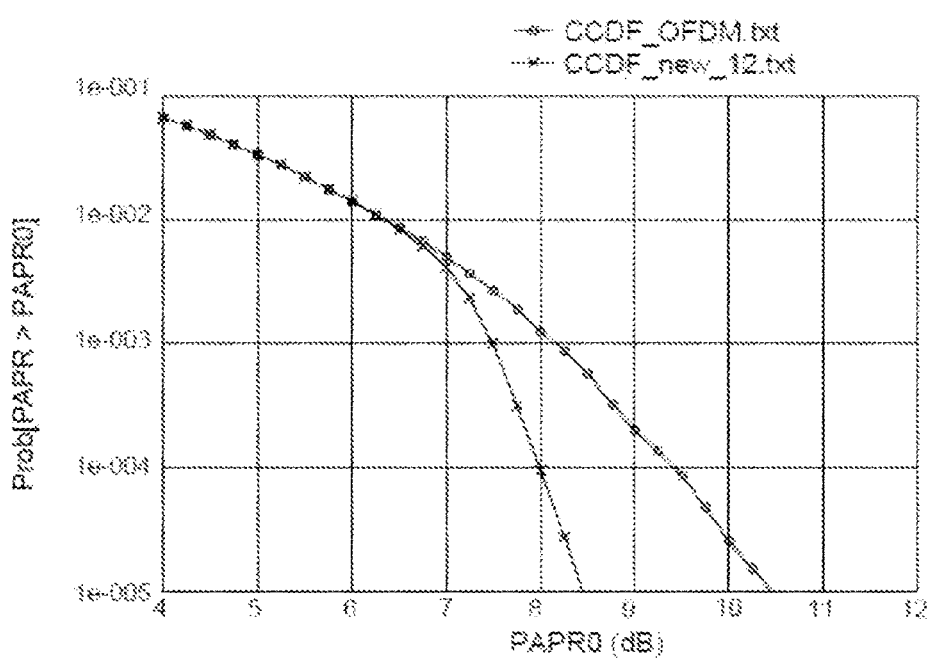
Figure 12:
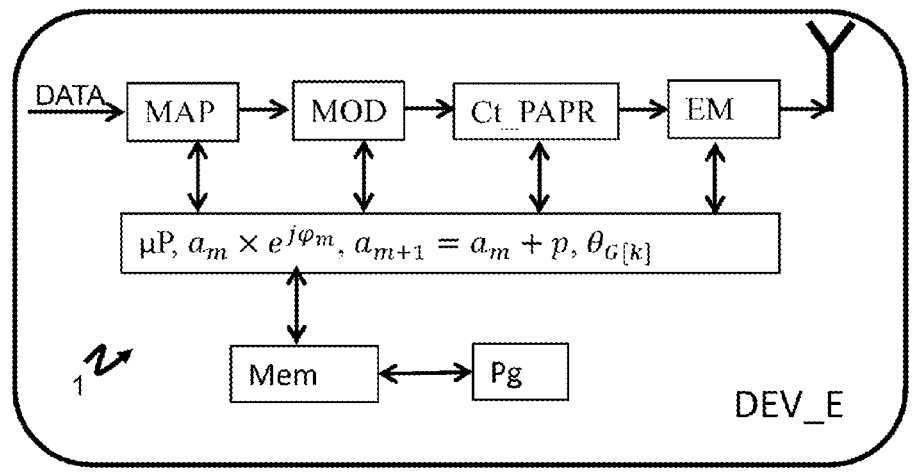

Other features and advantages of the invention will become more clearly apparent on reading the following description of embodiments, which are given by way of simple illustrative and non-limiting examples, and the appended drawings, in which: FIG. 1 is a diagram illustrating a transmission-end baseband processing chain according to the prior art, FIG. 2 is a representation of a conventional 16 QAM constellation, FIG. 3 is a conventional time-frequency representation of OFDM symbols, FIG. 4 is a time-domain representation of an OFDM signal delivered by a conventional transmission-end baseband chain with an OFDM modulator by which only 10% of the carriers are used, FIG. 5 is a representation, against a real axis X(I) and an imaginary axis Y(Q), of a first configuration of a polar constellation employable in a method according to the invention, FIG. 6 is an illustration of one example of the phase variation applicable to the points of the modulation illustrated in FIG. 5, FIG. 7 is a representation, against a real axis X(I) and an imaginary axis Y(Q), of a second configuration of a polar constellation employable in a method according to the invention, FIG. 8 schematically shows the maximum phase variation applicable to the points of the modulation illustrated in FIG. 7, FIG. 9 is a block diagram illustrating the implementation of a method according to the invention by a corresponding device, FIG. 10 shows the curve of the CCDF values obtained without the reduction method according to the invention, and the curve of the CCDF values obtained with the reduction method according to the invention with a block of 120 carriers, FIG. 11 shows the curve of the CCDF values obtained without the reduction method according to the invention, and the curve of the CCDF values obtained with the reduction method according to the invention with a block of 12 carriers, FIG. 12 is a diagram of the simplified structure of an equipment according to the invention able to implement a telecommunication method according to the invention.

Figure 13:
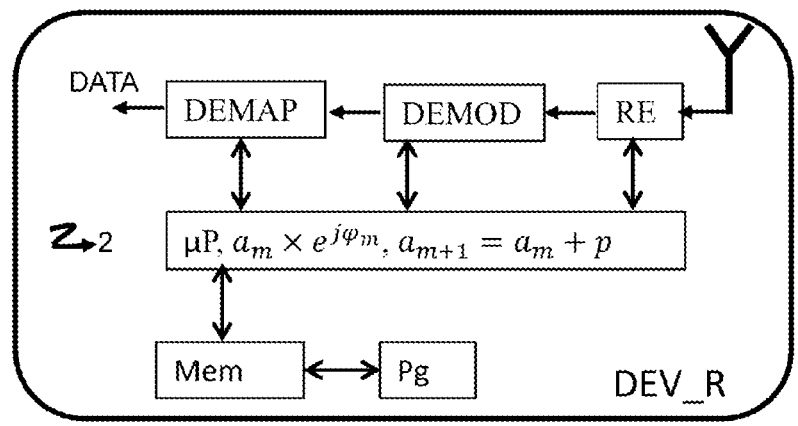

FIG. 13 is a diagram of the simplified structure of an equipment according to the invention able to implement a reception method according to the invention.

DESCRIPTION OF PARTICULAR EMBODIMENTS

The general principle behind the invention is to map input data to a polar constellation the M points of which are distributed on concentric circles, there being a constant interval p between the circles, and then to perform multi-carrier block modulation of the points of the constellation and controlled rotation of the phase of the blocks before addition to form a multi-carrier symbol. The modulation employs $N_{IFFT}$ subcarriers. The modulation is performed blockwise by K modulators of $N_{IFFT}$ subcarriers. Each output of a modulator or block may be phase shifted with a phase-rotation vector before the blocks are added together. The PAPR of the multi-carrier symbol resulting from a complex addition after phase rotation of a symbol resulting from a block is compared with the PAPR of a multi-carrier symbol obtained with a different phase rotation. The comparison may be repeated for various phase-rotation values. Only the symbol of lowest PAPR is selected and transmitted.

Polar Constellations According to the Invention

The interval p is a non-zero positive real number. The points of the constellation are therefore distributed over at least two distinct circles. The M points have coordinates expressed in polar form $a_{m \times e}{}^{j\varphi_m}$, m=0, ..., M−1, which are said to be polar coordinates, with reference to a representation with two axes defining four quadrants, with the constraint that $a_{m+1}=a_m+p$. $a_m$ is the amplitude of a point, and $\varphi_m$ is the phase of this point. M is the order of the modulation.

For example, a 16 QAM modulation has an order M=16.

The constellation has the particularity that there is at most one point on each circle per quadrant considered in respect of the expression in polar form of the constellation. When the constellation is determined for a quadrant of size 2π, namely the quadrant [0–2π[, then there is at most one point per circle. When the constellation is determined per quadrant of size π, namely for the quadrants $$\left[0, \pi\right[ \text{ and } \left[\pi, 0\right[, \text{ or } \left[\frac{\pi}{2}, 3\frac{\pi}{2}\right[ \text{ and } \left[3\frac{\pi}{2}, 0\right[,$$

then there is at most one point per semicircle.

When the constellation is determined per quadrant of size π/2, namely for the quadrants $$\left[0, \pi/2\right[, \left[\pi/2, \pi\right[, \left[\pi, 3\frac{\pi}{2}\right[ \text{ and } \left[3\frac{\pi}{2}, 0\right[,$$

then there is at most one point per quarter circle.

The Cartesian coordinates (x, y) before normalization corresponding to the polar coordinates of the points of the constellation may be expressed in the form:

$$s_m = a_m \cdot \cos(\varphi_m); y_m = a_m \cdot \sin(\varphi_m) \text{ with } \varphi_m \varepsilon [0, 2\pi[$$

If the size of an interval is set so p=1 and the amplitude of the first point is considered to be equal to one, then:

$$a_0 = 1 \text{ and } a_{m+1} = a_m + 1.$$

It is common to apply a normalization factor during mapping or at the end of mapping to the various symbols. The normalization factor "F" depends on the interval between the points of the constellation and on the modulation order M. Under these conditions, it is given by the expression:

$$F(M) = \frac{1}{\sqrt{\dfrac{\sum_{m=1}^{M} a_m^2}{M}}}$$

The normalization operation is an operation well known to those skilled in the art, so it is not described further.

FIG. 5 shows a first configuration of a polar constellation used according to the invention, which configuration is said to be a spiral configuration. This first configuration has the particularity that the points are distributed over a quadrant [0-2π[. The configuration shown corresponds to a constellation of order M=16. Each point has the coordinates: $a_m \times e^{j\varphi_m}$, $a_m=(m+1)\times p$, m=0, ..., 15 and a phase $\varphi_m$ with a determined interval between two successive points i.e. on two successive circles, for example a constant interval of π/4, $\varphi\varphi_{m+1}=\varphi_m+\pi/4$. Hence, unlike configurations that have not been illustrated, the phase $\varphi_m$ does not remain constant but varies between the successive points. This first configuration is particularly advantageous with respect to phase variations because the reception-end demodulation may be performed based solely on detection of the amplitude of the received constellation points. Any phase variation during the transmission between the transmitter and the receiver does not affect the demodulation.

The following table is one possible example of the way in which binary input data may be mapped to the points of a polar constellation according to the first configuration (illustrated in FIG. 5), employing Gray code. The modulation order is M=16, the amplitude interval of the points of this constellation is p=1 and the phase is a multiple of $\pi/4$.

TABLE 1

| m | Gray code | $X_m$ before normalization |
|---|---|---|
| 0 | 0000 | $1 \cdot e^{j\pi/4}$ |
| 1 | 0001 | 2 |
| 2 | 0011 | $3 \cdot e^{-j\frac{\pi}{4}}$ |
| 3 | 0010 | $4 \cdot e^{-j\frac{\pi}{2}}$ |
| 4 | 0110 | $5 \cdot e^{-j\left(\frac{3\pi}{4}\right)}$ |
| 5 | 0111 | $6 \cdot e^{-j\pi}$ |
| 6 | 0101 | $7 \cdot e^{-j\left(\frac{5\pi}{4}\right)}$ |
| 7 | 0100 | $8 \cdot e^{j\frac{\pi}{2}}$ |
| 8 | 1100 | $9 \cdot e^{j\pi/4}$ |
| 9 | 1101 | 10 |
| 10 | 1111 | $11 \cdot e^{-j\frac{\pi}{4}}$ |
| 11 | 1110 | $12 \cdot e^{-j\frac{\pi}{2}}$ |
| 12 | 1010 | $13 \cdot e^{-j\left(\frac{3\pi}{4}\right)}$ |
| 13 | 1011 | $14 \cdot e^{-j\pi}$ |
| 14 | 1001 | $15 \cdot e^{-j\left(\frac{5\pi}{4}\right)}$ |
| 15 | 1000 | $16 \cdot e^{j\frac{\pi}{2}}$ |

FIG. 6 illustrates me result or a frequency deviation between the transmitter and the receiver with the constellation defined above over a plurality of consecutive OFDM symbols. FIG. 6 illustrates one example of the phase variation applicable to the points of the modulation called the spiral modulation, which is illustrated in FIG. 5, that remains acceptable with respect to obtaining correct demodulation. This "spiral" structure makes it possible to withstand large variations in phase between the transmitter and the receiver of the system. This embodiment is particularly suitable for systems operating in the terahertz's, by which a lot of phase noise is generated due to poor oscillator performance.

FIG. 7 shows a second configuration of a polar constellation used according to the invention. This constellation is of order M=16. It has the particularity that the pattern of points is reproduced between the four quadrants, each quadrant representing [0, $\pi/2$[. Each point of a quadrant has the coordinates:

$$a_m \times e^{j\varphi_m}, a_m = (m+1) \times p, m = 0, \ldots, \frac{M}{4} - 1, M = 16.$$

Thus, for each quadrant, there is only one point per concentric circle and the phase $\varphi_m$ of the point m is chosen according to a determined criterion, for example with a constant interval of $\pi/8$ between two points or an interval of zero between the two points on the circles most distant in the same quadrant. This second mode is robust against additive white Gaussian noise because the minimum distance between the emitted points is large. According to the illustrated example of this second embodiment, the phase $\varphi_m$ is a multiple of $\pi/12$ and more particularly $\varphi_0=\varphi_3=\pi/2$, $\varphi_1=\pi/12$ and $\varphi_2=5\pi/12$. This second embodiment as illustrated is very advantageous because it is compatible with many existing OFDM demodulators capable of demodulating an OFDM/16 QAM modulation. Specifically, for each quadrant, the points are close to those of a conventional 16 QAM constellation as shown in FIG. 2.

FIG. 8 shows the maximum amount of phase variation applicable to the points of the modulation illustrated in FIG. 7, transmission-end, that remains compatible with obtaining correct demodulation reception-end. Within the limits of this maximum amount, i.e. as long as the phase variation remains within the limit $+\pi/4$ with respect to the phase of the transmitted point, the receiver is able to demodulate, without ambiguity, the received modulation points despite the phase variation between the transmitter and the receiver.

The block diagram of FIG. 9 illustrates implementation of one embodiment of a method according to the invention by a corresponding device.

A symbol binary encoder MAP converts (maps) an input binary data packet, for example a binary code word of data of a multimedia communication, into a complex point of a constellation using a conventional technique known to those skilled in the art. According to the invention, the constellation is a polar constellation.

The obtained points of the constellation are then input into K modulators $MOD_1$, $MOD_2$, $MOD_3$ and block modulated– K=3 in the illustration. K is configurable. The constellation points are input into the K modulators in such a way that each point is modulated using a different subcarrier of the equivalent modulator of $N_{IFFT}$ subcarriers. Each of the K modulators performs a frequency-time conversion, conventionally via an inverse Fourier transform IFFT of $N_{IFFT}$ subcarriers, to generate a multi-carrier symbol of N time-domain samples, $N=N_{IFFT}$.

For each time index n, n $\varepsilon$ [0, N–1], complex addition by a $1^{st}$ adder $ADD_{[1]}$ of the K outputs n of the K modulators gives a time-domain sample $Ref_{ofdm\,[n]}$ of a multi-carrier symbol $Ref_{ofdm}$ identical to the one obtained by the equivalent modulator of $N_{IFFT}$ subcarriers in the absence of phase rotation before addition.

The impact of a phase-rotation vector on one or more of the output symbols of the K modulators before complex addition of these symbols with one another is evaluated by the controller Ct_PAPR.

The controller Ct_PAPR receives, by way of input, each of the N outputs of the K modulators, and the N samples $Ref_{ofdm[n]}$ of the multi-carrier symbol $Ref_{ofdm}$.

The controller Ct_PAPR determines the PAPR, which is said to be the initial PAPR, of the multi-carrier symbol Ref$_{ofdm}$, which itself serves as initial value for the current reference multi-carrier symbol x$_{ofdm\_aux}$.

The controller Ct_PAPR determines at least one phase-rotation vector θ$_{[1]}$, θ$_{[2]}$, θ$_{[3]}$ and applies it to at least one of the symbols delivered by the K modulators. Thus, all the 5 points of the constellation that are input into the K modulators undergo the phase rotations θ$_{[1]}$, θ$_{[2]}$, and θ$_{[3]}$ respectively. The various phase-rotation vectors θ$_{[1]}$, θ$_{[2]}$, and θ$_{[3]}$ may have different values or indeed some or all may be the same.

The controller Ct_PAPR compares the PAPR of the multi-carrier symbol x$_{ofdm\_i}$ resulting from the complex addition by a $2^{nd}$ adder ADD$_{[2]}$ of the samples n of the symbols after rotation of at least one of the symbols input into the adder, with the PAPR of the current reference x$_{ofdm\_aux}$. The output multi-carrier symbol x$_{ofdm}$ is that of the two input multi-carrier symbols that has the lowest PAPR. This multi-carrier symbol x$_{ofdm}$ of lower PAPR becomes the new current reference multi-carrier symbol x$_{ofdm\_aux}$.

The comparison may be repeated for various phase-rotation vectors using an iterative method of L iterations, L being configurable. At the end of the iterations, only the multi-carrier symbol of lowest PAPR is transmitted.

The phase rotation applied to a point of the constellation by means of the phase-rotation vector is bounded by the value θ$_{max}$, which is configurable.

According to one mode of implementation, each modulator implements an inverse Fourier transform. The multi-carrier symbols obtained are said to be OFDM symbols.

The sample n of the time-domain signal delivered by a block IFFT (implementation of an inverse Fourier transform) is denoted: x$_{b_{[k][n]}}$ with k the index of the IFFT block k ε [0: K−1], K the total number of IFFT blocks and n the time index n ε [0: N−1]. N=N$_{IFFT}$ the size of the inverse Fourier transform IFFT.

The reference OFDM symbol Ref$_{ofdm}$ is written for each time index "n":

$$Ref_{ofdm[n]} = \sum_{k=0}^{K-1} x_{b_{[k][n]}}$$

The method evaluates the PAPR of the reference OFDM symbol Ref$_{ofdm}$, which is said to be the initial PAPR.

One particular iterative embodiment of the method may be carried out as follows:
initialization:
  of the overall-rotation-angle vectors: θ$_{G[k]}$=0, k ε [0: K−1]
  of a current reference OFDM symbol: x$_{ofdm\_aux}$=Ref$_{ofdm}$
  PAPR=initial PAPR
loop n°1 of a number L of iterations of the method
  loop n°2 of the number of blocks K: k ε [0: K−1]
    Initialization of the phase-rotation angle θ$_{[k]}$ with θ$_{[k]}$ ε [−θ$_{max}$/2: θ$_{max}$/2], θ$_{max}$ being the maximum range of phase variation in radians for a block "k",
    loop n°3 of a number P of phase rotations θ$_{[k]}$ to be tested with Δθ a phase increment,
      the complex rotation vector for block "k" is written: e$^{(j2πθ_{[k]})}$, the variable "j" is the imaginary unit,
      for n ε [0: N−1], sample [n] of the new OFDM symbol x$_{ofdm}$ is thus obtained:

x$_{ofdm[n]}$=x$_{ofdm)aux[n]}$+x$_{b_{[k][n]}}$(e$^{(j2πθ_{[k]})}$−1)

computation of the PAPR value of the new OFDM symbol x$_{ofdm}$
if this PAPR value is better than the previous one, storage in memory of the rotation angle, denoted θ$_{opt[k]}$=θ$_{[k]}$, storage in memory of the new PAPR
if the new value of the overall rotation angle θ$_{G[k]}$+θ$_{opt[k]}$ exceeds the determined maximum threshold: θ$_{G[k]}$+θ$_{opt[k]}$≥θ$_{max}$ then exit loop n°3
update of the overall rotation angle: θ$_{G[k]}$=θ$_{G[k]}$+θ$_{opt[k]}$
θ$_{[k]}$=θ$_{[k]}$+Δθ x$_{ofdm_{aux[n]}}$ = x$_{ofdm[n]}$ for n ε [0: N−1]
end of loop n°3
if the angle of rotation θ$_{opt[k]}$ is different from "0", then sample [n], for n ε [0: N−1], of the new OFDM symbol is updated with this angle θ$_{opt[k]}$ for the block k in question:

x$_{ofdm[n]}$=x$_{ofdm[n]}$+x$_{b_{[k][n]}}$(e$^{(j2πθ_{opt[k]})}$−1)

Update of the: x$_{b_{[k][n]}}$
x$_{b_{[k][n]}}$=x$_{b_{[k][n]}}$e$^{(j2πθ_{opt[k]})}$
end of loop n°2
end loop n°1
transmission of the new multi-carrier symbol: x$_{ofdm_{[n]}}$ n ε [0: N−1].

According to one embodiment that is not very complex, the number of iterations L=1, only a few blocks of the set of K blocks are considered in loop n°2 and a single rotation angle ±θ is used in loop n°3 to test the improvement in PAPR.

According to one embodiment, the method scrambles the constellation points with a scrambler. This scrambling is carried out in the frequency domain, after the mapping by the mapper MAP and before the modulation by the K modulators. This scrambling makes it possible to reduce PAPR which is, as a result of the construction of a polar constellation, greater than that obtained with a QAM constellation. For example, the scrambler may be a succession of shift registers initialized to 1 implementing the sequence p(n) obeying the following relationship p(n)=X$^{11}$+X$^2$+1, with X the registers. The scrambling function applied to data d$_{(n)}$ input into the register input is:

d$_{(n)}$=d$_{(n)}$*Pseudo$_{(n)}$

Pseudo$_{(n)}$=2*p$_{(n)}$−1

If scrambling is used transmission-end, the same but inverse scrambling function must be used reception-end.

Performance in terms of PAPR reduction is assessed by measuring the CCDF (Complementary Cumulative Distribution Function). There are two formulas for this measurement:

$$PAPR = \frac{\max_{0 \leq t \leq N.T}[|x_{(t)}|^2]}{E[|x_{(t)}|^2]} \quad (1)$$

$$PAPR_{(t)} = \frac{[|x_{(t)}|^2]}{E[|x_{(t)}|^2]} \quad (2)$$

The second (2) is used to illustrate the performance in terms of PAPR reduction obtained according to the invention.

Performance was assessed with a transmission-end device employing a 2048-point FFT with 1200 payload carriers, the other carriers being null. Reception-end, a 1504-bit duo-binary turbo-code decoder and 8 iterations were used for decoding.

FIG. 10 shows the curve of the CCDF values obtained without the reduction method according to the invention, and the curve of the CCDF values obtained with the reduction method according to the invention. To obtain the latter curve, the reduction method according to the invention was implemented with a block of 120 carriers, therefore 10 blocks resulting from the 10 IFFTs, a single iteration L=1 and a single rotation-angle value ±0.

FIG. 11 shows the curve of the CCDF values obtained without the reduction method according to the invention, and the curve of the CCDF values obtained with the reduction method according to the invention. To obtain the latter curve, the reduction method according to the invention was implemented with a block of 12 carriers, with reference to the block of 4G-LTE (Resource Block). Comparison of the curves of each of FIG. 10 and FIG. 11 illustrates the improvement in respect of reduction of PAPR obtained with the invention. Comparison of the curves according to the invention of FIG. 10 and FIG. 11 illustrates the fact that the increase in the number of blocks allows the reduction in PAPR to be increased.

The simplified structure of one embodiment of an equipment according to the invention able to implement a telecommunication method according to the invention is illustrated in FIG. 12. This equipment DEV_E may irrespectively be a base station or a mobile terminal.

The equipment DEV_E comprises a microprocessor µP, operation of which is controlled via execution of a program Pg the instructions of which allow a telecommunication method according to the invention to be implemented. The equipment DEV_E further comprises a mapper MAP, an OFDM modulator MOD, a PAPR limiter Ct-PAPR, a transmitter EM, and a memory Mem comprising a buffer memory. The OFDM modulator MOD conventionally employs a plurality of inverse Fourier transforms IFFT, as illustrated in the diagram in FIG. 9.

On initialization, the code instructions of the program Pg are for example loaded into the buffer memory Mem before being executed by the processor µP. The microprocessor µP controls the various components: mapper MAP, K modulators $MOD_1$, $MOD_2$, $MOD_3$, PAPR limiter Ct-PAPR, and transmitter EM.

Configuration of the equipment involves configuring at least the order of the modulation, the interval p of the constellation, the value of $a_0$, the number of iterations L, the maximum rotation angle $\theta_{max}$, and the number K of (IFFT) blocks. The order of the modulation determines the number of points M.

Thus, by executing the instructions, the microprocessor µP:
  determines the polar coordinates of the points of the constellation: $a_m \times e^{j\varphi_m}$, m=0, . . . , M−1, such that $a_{m+1}=a_0+p$, p>0,
  controls the various components so that, for an input data packet DATA:
    the mapper MAP maps the data DATA to points of the constellation,
    the K modulators $MOD_1$, $MOD_2$, $MOD_3$ modulate the data mapped to the various carriers, to generate K symbols,
    a complex adder adds the K symbols to obtain the OFDM symbol with which the reference Ref is initialized,
    the PAPR limiter Ct-PAPR determines the rotation angles $\theta_{G[k]}$ to be applied to the symbols output from the K modulators (K blocks of index k) to obtain the OFDM symbol to be transmitted, which has the lowest PAPR, via comparison with the Ref, which is updated, on each new determined rotation angle, with the obtained OFDM symbol of lower PAPR,
    the transmitter EM transmits a radio signal representing the OFDM symbol of lowest PAPR.

The simplified structure of one embodiment of an equipment according to the invention able to implement a reception method according to the invention is illustrated in FIG. 13. This equipment DEV_R may irrespectively be a base station or a mobile terminal.

The equipment DEV_R comprises a microprocessor µP, the operation of which is controlled via execution of a program Pg the instructions of which allows a reception method according to the invention to be implemented. The equipment DEV_R further comprises a demapper DEMAP, an OFDM demodulator DEMOD, a receiver RE, and a memory Mem comprising a buffer memory. On initialization, the code instructions of the program Pg are for example loaded into the buffer memory Mem before being executed by the processor µP. The microprocessor µP controls the various components: demapper DEMAP, demodulator DEMOD, and receiver RE.

According to one embodiment, the demodulator DEMOD implements a two-step demodulation to combat against a relative weakness of a polar constellation with respect to additive white Gaussian noise. In a first step, the demodulator DEMOD assesses the common phase error for a received OFDM symbol and corrects the OFDM symbol accordingly. In a second step, the demodulator DEMOD demodulates the constellation points in a conventional way by means of an LLR computation (LLR being the acronym of Log-Likelihood Ratio), as with a QAM constellation. Conventionally, the demodulator employs a Fourier transform FFT. The demapper DEMAP performs the inverse operation of the mapper MAP.

Configuration of the equipment comprises at least configuring the order of the modulation, the interval of the constellation, and the value of $a_0$. The order of the modulation determines the number of points M.

Thus, by executing the instructions, the microprocessor µP:
  determines the polar coordinates of the points of the constellation: $a_m \times e^{j\varphi_m}$, m=0, . . . , M−1, such that $a_{m+1}=a_m+p$, p>0,
  controls the various components so that:
    the receiver RE receives the radio signal representative of the OFDM symbols,
    the demodulator DEMOD demodulates the successive OFDM symbols to estimate the points of the constellation mapped to the various carriers,
    the demapper DEMAP demaps the points of the constellation to estimate the data DATA.

The equipment DEV_R, which receives the radio signal transmitted according to one embodiment of a method according to the invention, may demodulate the received constellation points by estimating the amplitude of the received point $(x_{r_i}, y_{r_i})$:

$$x_{r_i} = a_{r_m} \cos(\varphi_{r_i}) + b_{x_i}$$

$$y_{r_i} = a_{r_i} \sin(\varphi_{r_i}) + b_{y_i}$$

$b_x$ and $b_y$ being the additive white Gaussian noise projected onto the channels X and Y.

Since the constellation is known, and given that there is at most one point per circle in a quadrant, the equipment DEV_R is therefore able, based on amplitude, to determine the received point even if there is an uncertainty in its position, provided that a plurality of quadrants were employed transmission-end to define the constellation.

After having estimated the amplitude of the received point, the equipment DEV_R may estimate phase error by comparing the estimated points projected onto the axes X(I) and Y(Q) with the transmitted points. The common phase error results mainly from variations in the oscillators and/or in Doppler shift:

$$\Delta\varphi_i = \varphi_i - (\varphi_{r_i}) + b_i$$

By summing the various phase-error estimates made for each OFDM carrier i.e. for each point of the constellation that modulated a carrier, the equipment DEV_R is able to improve the phase-error estimate and thus to decrease the influence of white noise on the estimation of the emitted point:

$$\Delta_\varphi = L\Sigma_{i=1}^{L} \Delta_{\varphi i}$$

with L the number of OFDM carriers used to estimate the phase variations.

Once the common phase error has been estimated, the equipment DEV_R may correct all of the constellation points modulating an OFDM symbol. This correction may be made both in the frequency domain i.e. after the IFFT demodulation, and in the time domain i.e. before the IFFT demodulation. By making the correction in the time domain, it is possible to decrease the interference between carriers that results from the phase rotation.

Determination of phase error allows demodulation error to be decreased.

Reception-end correction power is directly related to the structure of the polar constellations—for example, for the polar constellation limited to one quadrant, the maximum phase rotation is $\pm\pi/4$ and for the spiral constellation the limit is $\pm\pi$. Limiting phase rotation to reduce PAPR also makes it possible to continue to assess phase variations caused by Doppler shift or by the phase noise of the oscillators.

As a result, the invention also applies to one or more computer programs, in particular a computer program on or in a data medium, suitable for implementing the invention. This program may use any programming language and take the form of source code, object code or of code intermediate between source code and object code, such as code in a partially compiled form, or in any other form desirable for implementing a method according to the invention.

The data medium may be any entity or device capable of storing the program. For example, the medium may comprise a storage means, such as a ROM, for example a CD-ROM or a microelectronic circuit ROM, or else a magnetic recording means, for example a USB key or a hard disk.

Moreover, the data medium may be a transmissible medium such as an electrical or optical signal, which may be routed via an electrical or optical cable, by radio or by other means. The program according to the invention may in particular be downloaded from a network such as the Internet.

As an alternative, the data medium may be an integrated circuit into which the program is incorporated, the circuit being configured to execute or to be used in the execution of the method in question.

The invention claimed is:

1. A telecommunication method comprising:
    transmitting a multi-carrier symbol constructed from points of a polar constellation, said points being block modulated by at least two multi-carrier modulators; and
    controlling at least one phase-rotation-angle vector of at least one of the blocks of modulated points to decrease a peak-to-average power ratio (PAPR) of the transmitted multi-carrier symbol,
    wherein the polar constellation comprises a set of points distributed on concentric circles with a constant interval p>0 between two successive concentric circles, and
    wherein in reference to a representation of the polar constellation with two axes defining four quadrants, the polar constellation is defined per block of a given number n of quadrants, with n equal to 1, 2 or 4, and the number of points of the polar constellation per concentric circle is limited to one per block.

2. The telecommunication method of claim 1, further comprising:
    mapping, via a mapper, input data to the points of the polar constellation, the polar constellation comprising a set of M points having coordinates expressed in polar form $a_m \times e^{j\varphi_m}$, m=0, . . . , M−1, where $a_m$ is an amplitude of a point and $\varphi_m$ is a phase of the point, the polar constellation being determined in a manner that $a_{m+1} = a_m + p$, p>0,
    block modulating, via K multi-carrier modulators, the points of the polar constellation, the points being input into the K multi-carrier modulators, to generate K symbols, K≥2,
    first adding, via a first adder, the K symbols, to obtain a first multi-carrier symbol, and determining an initial PAPR of the first multi-carrier symbol,
    phase rotating, via a phase shifter, at least one of the K symbols by a phase-rotation angle θ, to generate K phase-shifted symbols,
    second adding, via a second adder, the K phase-shifted symbols, to obtain a new multi-carrier symbol,
    comparing the initial PAPR with a PAPR of the new multi-carrier symbol to obtain a lowest PAPR, and
    performing the transmitting of the multi-carrier symbol utilizing the multi-carrier symbol among the first multi-carrier symbol and the new multi-carrier symbol that has the lowest PAPR.

3. The telecommunication method of claim 2, wherein the phase rotating, the second adding, and the comparing are performed iteratively for a plurality of different phase-rotation-angle vectors resulting in a plurality of iterations.

4. The telecommunication method of claim 3, wherein the plurality of iterations are iterated for a plurality of symbols.

5. The telecommunication method of claim 1, wherein the points of the polar constellation are block modulated via an inverse Fourier transform.

6. The telecommunication method of claim 1, wherein the polar constellation comprises a set of M points having coordinates expressed in polar form $a_m \times e^{j\varphi_m}$, m=1, . . . , M−1, where $a_m$ is an amplitude of a point and $\varphi_m$ is a phase of the point, the polar constellation being determined in a manner that $a_{m+1}=a_m+p$, $p>0$, and wherein the coordinates of the points of the polar constellation are determined per quadrant according to $$a_{j+1} = a_j + p, j = 0, \ldots, \frac{M}{4} - 1.$$

7. The telecommunication method of claim 6, wherein M=16, p=1 and for each quadrant $\varphi_j=\alpha\times\pi/12$ with $\alpha$ is a natural number.

8. The telecommunication method of claim 6, wherein for each quadrant $$\varphi_{j+1} = \varphi_j, j = 0, \ldots, \frac{M}{4} - 1.$$

9. The telecommunication method of claim 8, wherein for two quadrants taken together $$\varphi_{j+1} = \varphi_j, j = 0, \ldots, \frac{M}{2} - 1.$$

10. The telecommunication method of claim 1, wherein the polar constellation comprises a set of M points having coordinates expressed in polar form $a_m\times e^{j\varphi m}$, m=0, ..., M−1, where $a_m$ is an amplitude of a point and $\varphi_m$ is a phase of the point, the polar constellation being determined in a manner that $a_{m+1}=a_m+p$, $p>0$, and wherein the coordinates of the points of the polar constellation are determined per block of two quadrants according to $$a_{j+1} = a_j + p, j = 0, \ldots, \frac{M}{2} - 1.$$

11. The telecommunication method of claim 1, wherein the polar constellation comprises a set of M points having coordinates expressed in polar form $a_m\times e^{j\varphi m}$, m=0, ..., M−1 where $a_m$ is an amplitude of a point and $\varphi_m$ is a phase of the point, the polar constellation being determined in a manner that $a_{m+1}=a_m+p$, $p>0$ and $\varphi_{m+1}=\varphi_m+p'=\varphi_m+p'''\times\pi$, with p''' being a non-zero real number.

12. The telecommunication method of claim 1, wherein the polar constellation comprises a set of M points having coordinates expressed in polar form $a_m\times e^{j\varphi m}$, m=0, ..., M−1 where $a_m$ is an amplitude of a point and $\varphi_m$ is a phase of the point, the polar constellation being determined in a manner that $a_{m+1}=a_m+p$, $p>0$, and $\varphi_m=\varphi$ for m=0, ..., M−1.

13. A telecommunication equipment comprising:
at least one processor;
at least one non-transitory computer readable medium comprising instructions stored thereon which when executed by the at least one processor configure the telecommunication equipment to:
map input data to points of a polar constellation, the polar constellation comprising a set of M points having coordinates expressed in polar form $a_m\times e^{j\varphi m}$, m=0, ..., M−1, where $a_m$ is an amplitude of a point and $\varphi_m$ is a phase of the point, the polar constellation being determined in a manner that $a_{m+1}=a_m+p$, $p>0$,
block modulate with K multi-carrier modulators the points of the polar constellation and generating K symbols, K≥2,
add the K symbols to obtain a multi-carrier symbol,
compute an initial peak-to-average power ratio (PAPR) of the multi-carrier symbol,
shift a phase of at least one of the K symbols by a phase-rotation angle vector, to generate K phase-shifted symbols,
add the K phase-shifted symbols to obtain a new multi-carrier symbol, and
compare the initial PAPR and a PAPR of the new multi-carrier symbol to obtain a lowest PAPR; and
a transmitter for transmitting the multi-carrier symbol with the lowest PAPR.

14. A non-transitory computer readable data medium comprising program instructions stored thereon for implementing a telecommunication method when said program instructions are loaded and executed in a telecommunication equipment, the telecommunication method comprising:
transmitting a multi-carrier symbol constructed from points of a polar constellation, said points being block modulated by at least two multi-carrier modulators; and
controlling at least one phase-rotation-angle vector of at least one of the blocks of modulated points to decrease a peak-to-average power ratio (PAPR) of the transmitted multi-carrier symbol,
wherein the polar constellation comprises a set of points distributed on concentric circles with a constant interval p>0 between two successive concentric circles, and wherein in reference to a representation of the polar constellation with two axes defining four quadrants, the polar constellation is defined per block of a given number n of quadrants, with n equal to 1, 2 or, 4, and the number of points of the polar constellation per concentric circle is limited to one per block.

* * * * *